United States Patent [19]

Takato et al.

[11] Patent Number: 5,515,528
[45] Date of Patent: May 7, 1996

[54] COMPUTER SYSTEM HAVING IMPROVED IDLING OPERATION

[75] Inventors: Toshikazu Takato; Tuneo Ido, both of Owariasahi, Japan

[73] Assignee: Hitachi, Ltd., Tokyo, Japan

[21] Appl. No.: 60,808

[22] Filed: May 12, 1993

[30] Foreign Application Priority Data

May 25, 1992 [JP] Japan .................... 4-132223

[51] Int. Cl.⁶ ............................................ G06F 13/00
[52] U.S. Cl. .................... 395/550; 395/375; 395/821; 364/DIG. 1; 364/DIG. 2
[58] Field of Search ........................ 395/550, 275, 395/375; 219/216; 355/30, 279

[56] References Cited

U.S. PATENT DOCUMENTS

| | | | |
|---|---|---|---|
| 4,777,609 | 10/1988 | Cavill et al. ........................ | 395/105 |
| 4,821,639 | 4/1989 | Carrington et al. ................. | 101/93.14 |
| 4,841,440 | 6/1989 | Yonezu et al. ...................... | 395/750 |
| 4,843,571 | 6/1989 | Notermans et al. ................. | 395/148 |
| 4,884,162 | 11/1989 | Ito et al. ............................. | 361/23 |
| 4,912,485 | 3/1990 | Minowa .............................. | 247/186 |
| 5,056,771 | 10/1991 | Beck et al. .......................... | 271/114 |

FOREIGN PATENT DOCUMENTS 55-118143 of 0000 Japan .

Primary Examiner—Parshotam S. Lall
Assistant Examiner—Zarni Maung
Attorney, Agent, or Firm—Fay, Sharpe, Beall, Fagan, Minnich & McKee

[57] ABSTRACT

An idling time of a peripheral equipment is dynamically controlled. Recent intervals of data transferred from a host system to the peripheral equipment are continuously measured, and an idling operation of the peripheral equipment is stopped or continued in accordance with the measured intervals. A printer in a stopped condition is started at the substantially same time as the start of dot-development of the print data transferred from the host system to the printer.

12 Claims, 2 Drawing Sheets

COMPUTER SYSTEM HAVING IMPROVED IDLING OPERATION

BACKGROUND OF INVENTION

1. Field of the Invention

The present invention relates to a computer system, and more particularly to a technique for optimizing an idling time of a computer or other peripheral equipment of the computer system. It also relates to a print control system of a printer for optimizing an idling time to extend a lifetime by preventing wear of parts of the printer, prevent noise by the idling operation and reduce an overhead time due to start and stop of the printer.

A rise time which is inherent to a printer is required before parts of the printer reach their operating speeds and the actual printing is permitted, after the start-up of the printer. It is a general trend that the rise time is longer as the printer speed is higher because the printer of higher speed has a larger printing mechanism.

Accordingly, if the printer mechanism is stopped immediately after the end of print and the printer receives print data immediately after the stop, the above rise time is required and the start of the actual printing is delayed. If the printer is not stopped assuming that data will be continuously sent, the printer mechanism continues the idling operation until data is received and the printing is started. As a result, it causes noise and wear of the printer parts, and in an electrophotographic printer, deterioration of a photoconductor drum or a photoconductive belt.

In a prior art printer, in order to solve the above problems, the printer is kept idling after the printing, waiting for data to be sent, but the wait time is timed out in a predetermined time, or a motor activation time is set from a computer (host system) to the printer as disclosed in JP-A-55-118143.

In the prior art, an elapsed time of data transfer to the printer is compared with a designated monitor time (reference value), and when the elapsed time exceeds the reference value, it is regarded as the end of print data and a print drive motor in the printer is stopped. In the prior art, when the printing is to be started after the motor has been stopped, the motor is started after the data is sent and the printer has to wait until a steady state is reached. No solution therefor is proposed.

The reference interval may be set by an operator to any value which is optimum to a system connected to the printer.

SUMMARY OF THE INVENTION

It is an object of the present invention to provide a print control system of a printer for effecting optimum print control to a system by continuously monitoring a transfer interval of data transferred to the printer and dynamically setting a reference interval in accordance with an operation condition of the printer.

In order to achieve the above object, in accordance with the present invention, an interval of data previously transferred from the host system to the printer is measured and the reference interval is updated in accordance with the measured interval. As a result, the operation condition of the printer is reflected to the reference interval and more suitable on/off control of the idling operation of the printer is attained.

In one embodiment of the present invention, an average of intervals of ten preceding print data is used as the reference interval. A method for setting the reference interval may be appropriately selected depending on the system, but at least the interval of the preceding data should be referenced in order to reflect the operation condition of the system, as the reference interval, an interval between first data most recently transferred and second data previously transferred may be used. In calculating the average of intervals of a plurality of preceding data, the respective intervals may be weighted so that an effect by more recent data appears more strongly.

In the embodiment, an elapsed time from the last data transfer is compared with the reference interval, and when the former reaches five to ten times of the latter, the idling operation is stopped. The reference interval may be set to include a margin and the durations of the elapsed time and the reference interval may be simply compared.

In the embodiment, one page of print data is used to measure the interval.

In the embodiment, the present invention is applied to the printer although the present invention is applicable to any peripheral equipment which requires the idling operation.

It is another object of the present invention to provide a printer which quickly responds to data transfer from a host system.

In order to achieve the above object, in accordance with the present invention, a mechanical operation unit which needs a rise time is started at substantially the same time as the start of dot development of print data, and the mechanical operation unit is set in the idling operation before the dot development of the print data is completed.

BRIEF DESCRIPTION OF THE DRAWINGS

These and other objects and technical advantages of the present invention will be readily apparent from the following description of the preferred exemplary embodiment(s) of the invention in conjunction with the accompanying drawings, in which FIG. 4 illustrates the detail drawing of the interface controller shown in FIG. 1.

DESCRIPTION OF THE PREFERRED EMBODIMENTS

Figure 1:
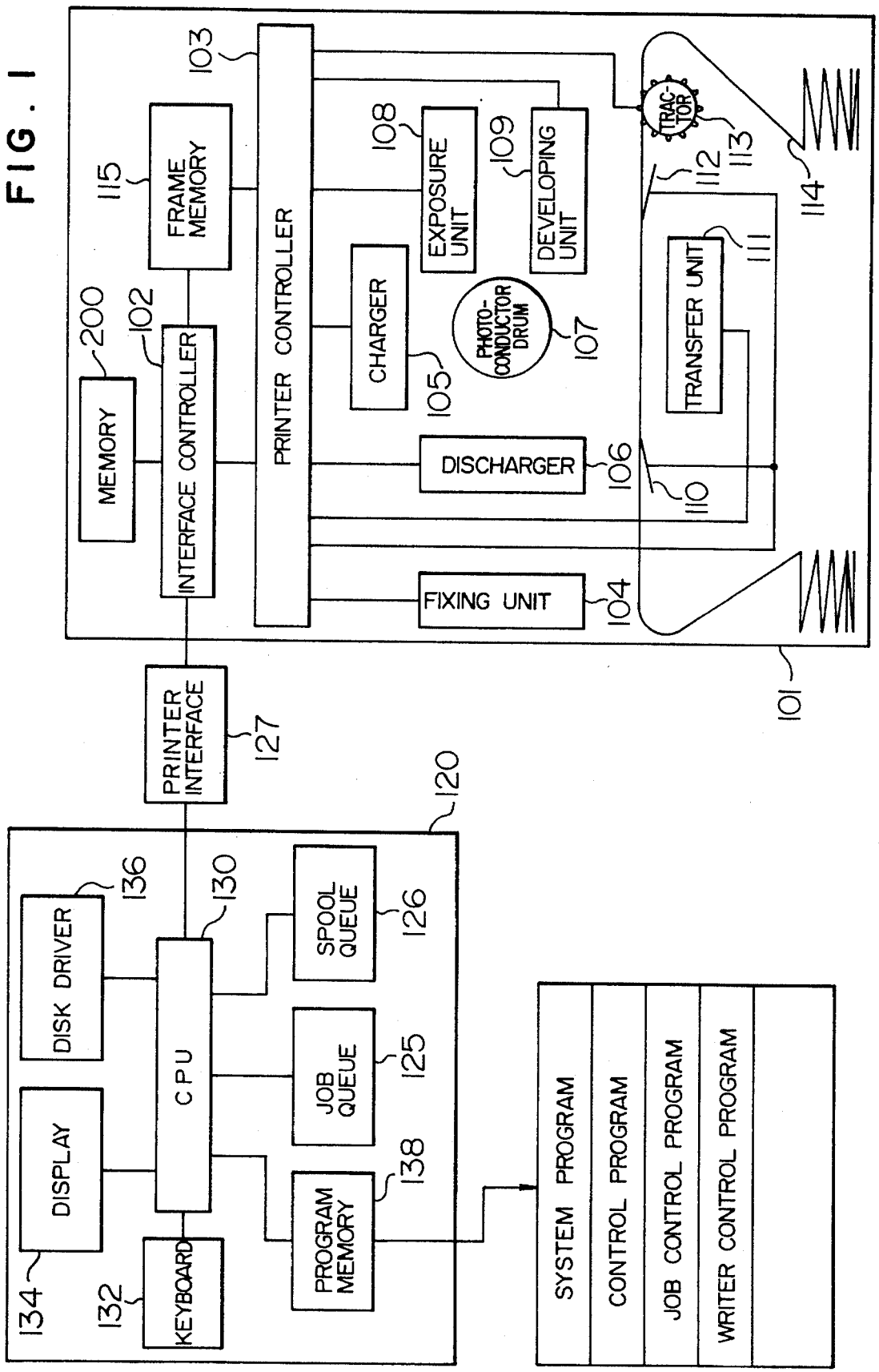
FIG. 1 shows a configuration of a computer system in one embodiment of the present invention.

FIG. 1 shows a configuration of a computer system of one embodiment of the present invention. The present system comprises a host system 120, and a printer 101 for receiving print data from the host system 120 for printing it out. The printer 101 comprises an interface controller 102 for receiving print data from the host system, sampling data transfer intervals, and dot-developing the received print data into a frame memory 115, a charger 105 for uniformly charging a surface of a photoconductor drum 107, an exposing unit 108 for forming an electro-static image of the dot-developed print data on the surface of the charged photoconductor drum 107, a discharger 106 for removing a residual image potential on the surface of the photosensitive drum 107 after the transfer, a developing unit 109 for transforming the electro-static image of the print data formed on the surface of the photoconductor drum 107 to a real image, sheet attractors 110 and 112 for attracting a continuous form 114 to the photosensitive drum 107, a transfer unit 111 for transferring the real image formed on the surface of the photoconductor drum 107 to the continuous form 114, a frame memory for dot-developing the received print data and holding it as one-page dot data, a tractor 113 for transporting the continuous form 114, and a printer controller 103 for controlling the above units. Numeral 200 denotes a memory for storing sampled data intervals. The interface controller 102 sets a reference interval by referencing the intervals in the memory 200.

The photoconductor drum 107 requires a substantial time (about 15 seconds) to reach a stable rotation state from a stop state. As the printer 101, a Hitachi printer HT-5642-01 may be used.

The host system 120 comprises a CPU 130, input/output devices 132, 134 and 136, and memory devices 125, 126 and 138. The memory 138 stores a system control program 121, a control program 122 which controls a job writer, a job control program 123 which controls the execution of a job, and a writer control program 124 which controls the storage and output of the print data generated by a print job. A job queue 125 queues jobs to be executed. A spool queue 126 queues print data generated by the print job. Numeral 127 denotes a printer interface connecting the host system 120 to the printer 101. The host system may be a Hitachi computer HL-7930-13.

The print jobs queued in the job queue 125 are taken out of the job queue 125 by the job control program 123 operated under the control of the control program 122 and sequentially executed. The print data generated by the execution of the print jobs are sequentially queued in the spool queue 126 by the writer control program 124 operated under the control of the control program 122.

When output to the printer 101 is commanded, the print data queued in the spool queue 126 are sequentially taken out of the spool queue 126 by the writer control program 124 and they are sent to the printer 101 through the printer interface 127. This process is continued until the print data to be outputted is exhausted in the spool queue 126. When the print data in the spool queue 126 is exhausted, the transfer of the print data to the printer 101 is interrupted until print data is queued in the spool queue 126.

The print data sent from the host system 120 is received by the interface controller 102 of the printer 101, dot-developed and stored in the frame memory 115. If the photoconductor drum 107 is in a stop condition, a command to start the rotation of the photoconductor drum 107 is issued to the printer controller 103 at substantially the same time as the start of the dot development to prepare for the print operation.

The monitoring of the operation of the photoconductor drum 107 and the command to start the rotation of the photoconductor drum 107 are executed by the interface controller.

When one page of print data is available in the frame memory 115, the command to start the print operation is issued to the printer controller 103.

The printer controller 103 checks the rotation state of the photoconductor drum 107 by the print operation start command, and if a predetermined speed has not been reached, it waits until the speed is stabilized. If the speed is stabilized, the charger 105, the exposure unit 108, the developing unit 109, the transfer unit 111, the discharger 106, the form attractors 110 and 112, and the tractor 113 are activated to start the print operation.

The printer controller 103 continues the printing until the print data in the printer 101 is exhausted or a command to stop the print operation is issued from the interface controller 102.

The transfer of the print data from the host system 120 is done by sequentially taking out the print data by registered queue at a time as long as the print data is present in the spool queue 126, and the print data is transferred to the printer 101 through the printer interface 127. When the transfer of the print data of one queue is over, an interruption occurs in the take-out of the next print data, and if there is print data to be continuously outputted, the transfer of the print data is resumed.

If there is not print data to be continuously outputted, the transfer of the print data to the printer 101 is interrupted until the print data is queued in the spool queue 126.

The interval of data transfer between the host system 120 and the printer 101 is classified into the following three major classes;

(1) the interval of data transfer when print data is continuously transferred, (2) the interval of data transfer which occurs when the queue taken out of the spool queue 126 is switched, and (3) the interval of data transfer from the exhaust of print data in the spool queue 126 to the occurrence of the next print data.

Of the above three types of intervals of data transfer, only the interval of data transfer (3) usually requires to stop the photoconductor drum 107, and it is not necessary to stop it in the case of the intervals of data transfer (1) and (2). However, since the three types of intervals of data transfer vary with the operation condition of the system, it is not possible to exactly determine the timing to stop the photoconductor drum by simply monitoring the data transfer from the host system 120 to the printer 101.

Figure 2:
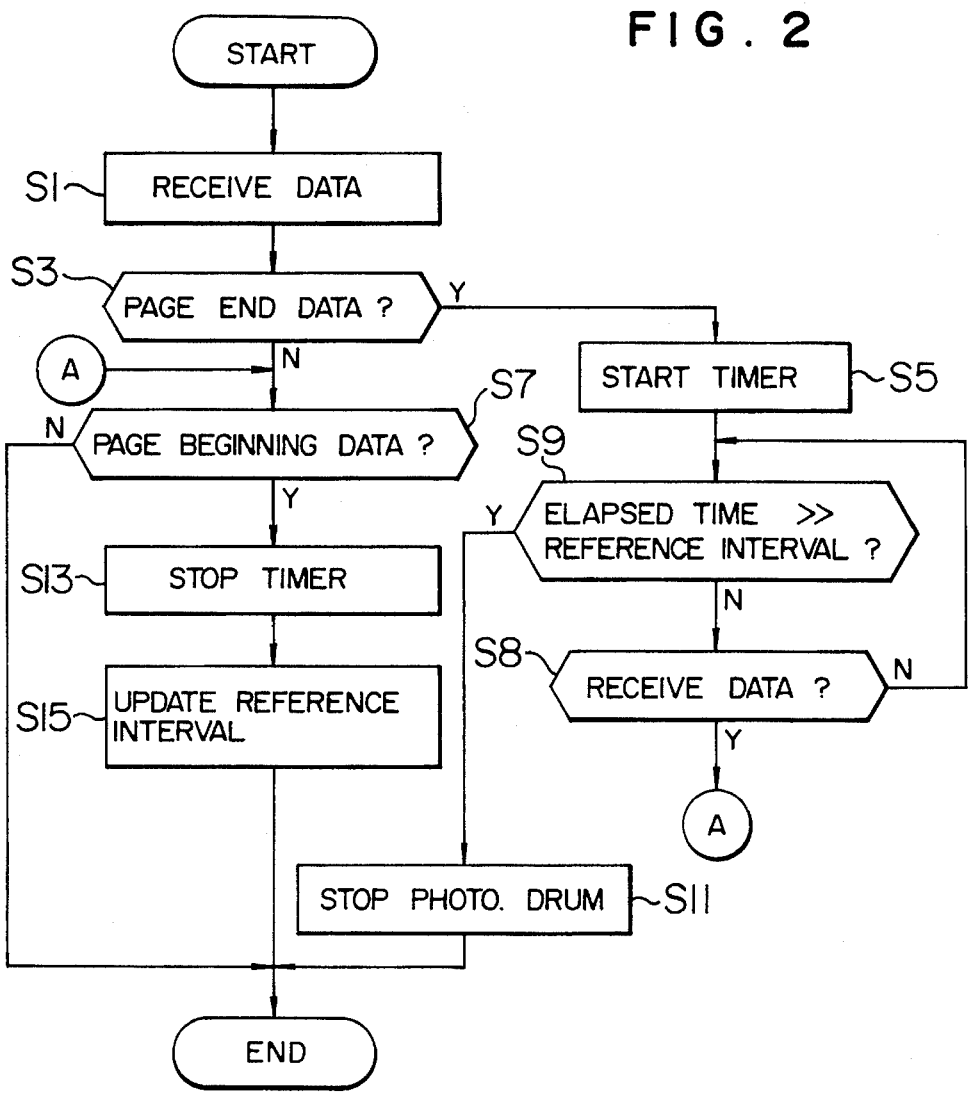
FIG. 2 shows a flow chart of an operation of the system in the embodiment.

A determination method in the embodiment is explained with reference to a flow chart of FIG. 2. In the present embodiment, it is noticed that page beginning data and page end data are attached to each one-page print data.

In a step 1, the monitoring of the transfer of the print data is started. When the page end data is received, an elapsed time timer 1021 (which is built in the interface controller 102) is started (steps 3 and 5). Until the page beginning data is received, the elapsed time measured by the timer 1021 is compared with a reference interval in comparer 1023 to be described later (steps 7, 8 and 9), and when the former substantially exceeds the latter, the rotation of the photoconductor drum 107 is stopped (steps 9 and 11). Thus, the idling operation of the printer is stopped. In the present embodiment, five to ten times of the reference interval is set as a threshold of determination in the step 9.

Figure 3:
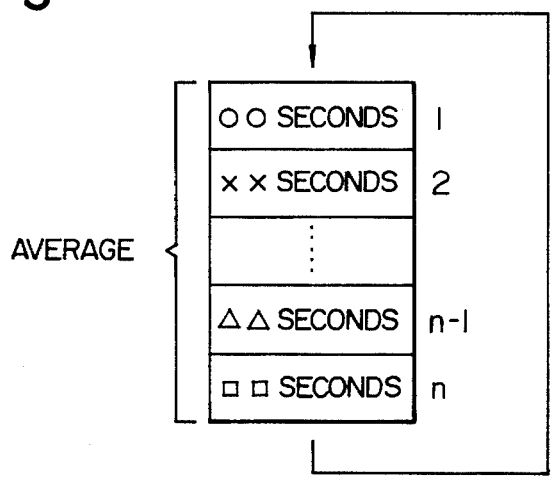
FIG. 3 illustrates a storage status of intervals.

The reference interval is an average of recent ten intervals between the page end data and the page beginning data. The intervals are stored in the memory 200 as shown in FIG. 3. As shown in steps 7, 13 and 15, when new page beginning data is received, the measurement timer is stopped and the data in the memory 200 are sequentially updated by the elapsed time or the new interval. The interface controller recalculates an average of the intervals in generator 1024 and stores it in an internal register as a new reference interval.

In the present embodiment, n in FIG. 3 is equal to 10. The number n is preferably between 5 and 15. When the system is started, the memory 200 is empty. Therefore, a reference interval is previously set in the register of the interface controller as it is in the prior art. When the number of intervals reaches 10, that is, when 11 pages of print data have been transferred, the preset reference interval is updated.

In the present embodiment, the transfer interval of one-page print data is measured to control the system, although the interval to be measured is not limited thereto. The interval of respective print data may be measured. In this case, the number n of intervals used as a reference to set the reference interval is preferably 100–150.

By the command to stop the print operation in the step 11, the printer controller 103 issues a stop command to the fixing unit 104, discharger 106, charger 105, photoconductive drum 107, exposure unit 108, developing unit 109, transfer unit 111, tractor 113, and form attractors 110 and 112. As a result, the continuous form 114 is separated from the photoconductor drum 107 and the rotation of the photoconductor drum 107 is stopped.

When the print job taken out of the job queue 125 is executed and the print data is queued in the spool queue 126, the writer control program 124 sends the print data from the writer control program 124 to the interface controller 102 of the printer through the printer interface 127.

On the other hand, the printer controller 103 checks the rotation state of the photoconductor drum 107, and if it is in the stop condition, it issues a command to start the rotation to the photoconductor drum 107. When the photoconductor drum reaches the predetermined speed, the photoconductor drum stands by until a print command is issued.

When the development of the print data in the frame memory 115 is over by the interface controller 102, a command to start the print operation is issued from the interface controller 102 to the printer controller 103. When the print operation is started, the printer controller 103 issues a start command to the fixing unit 104, discharger 106, charger 105, exposure unit 108, developing unit 109, transfer unit 111, tractor 113 and form attractors 110 and 112. As a result, the continuous form 114 is attracted to the photoconductor drum 107 and the print data formed on the surface of the photoconductor drum 107 is transferred to the continuous form 114.

In the present embodiment, when data is not continuously transferred from the host system 120, the photoconductor drum 107 is stopped to prevent the deterioration of the photoconductor drum 107 due to the idling rotation. Further, when the print operation is to be resumed after the exhaust of the print data, the photoconductor drum 107 is activated prior to the end of the dot-development of the print data so that the wait time of the photoconductor drum at the start of the print operation is eliminated.

In the present embodiment, the apparatus which uses the photoconductor drum as a photosensitive material is explained. The present invention is equally applicable to a belt-like photosensitive material.

The present invention has been described in detail. It should be understood that various changes, substitutions and alternations can be made hereto without departing from the spirit and scope of the present invention as defined by the appended claims.

What is claimed is:

1. A computer system having improved idling operation comprising:

a host system;

a peripheral equipment having a mechanical operation unit;

an interface connecting said host system and said peripheral equipment;

a first storing means for storing a reference interval;

first measuring means for measuring an elapsed time from a time of transfer of a last data that has been transferred most recently from said host system to said peripheral equipment to a present time;

means for comparing said elapsed time with said reference interval and generating a comparison result;

means for controlling a stop of said mechanical operation unit of said peripheral equipment in accordance with said comparison result;

second measuring means for measuring a data transfer interval between each time of transfer of a data and a time of transfer of a following data;

second storing means for storing n measurements of the data transfer interval by a first-in first-out fashion, where said n is an integer greater than or equal to two;

means for obtaining a new reference interval as a function of said n measurements of the data transfer interval in accordance with a predetermined rule; and means for updating said reference interval with said new reference interval and for storing said new reference interval in said first storing means.

2. The computer system according to claim 1 wherein said peripheral equipment is a printer.

3. The computer system according to claim 2 wherein said data is one-page print data.

4. The computer system according to claim 1, wherein said predetermined rule is effected to calculate a substantial average of said n measurements of said data transfer interval stored in said second storing means to obtain said new reference interval.

5. The computer system as defined in claim 1 further including means for transporting a print form;

means for receiving print data transferred from said host system;

means for dot-developing the print data for forming second data;

means having a mechanical operation unit for printing in accordance with the second data;

means for determining an operation condition of said mechanical operation unit; and means for starting said mechanical operation unit at a substantially same time as a start of dot developing said print data when said means for determining determines that said mechanical operation unit is in a stop condition and said print data is transferred from said host system.

6. The computer system defined in claim 5 wherein said means for starting stabilizes an operation condition of said mechanical operation unit before dot-developing is completed.

7. A printer to be connected to a host system through an interface, comprising:

a unit for transporting a print form;

a unit arranged to face the form and having a mechanical operation unit for printing on the form based on print data transferred from the host system;

first storing means for storing a reference interval;

first measuring means for measuring an elapsed time from a time of transfer of a last data that has been transferred most recently from said host system to said peripheral equipment to a present time;

means for comparing said elapsed time with said reference interval and for generating a comparison result;

means for controlling a stop of said mechanical operation unit of said peripheral equipment in accordance with the comparison result;

second measuring means for measuring a data transfer interval between each time of transfer of a data and a time of transfer of a following data;

second storing means for storing n measurements of said data transfer interval by a first-in first-out fashion, where said n is an integer greater than or equal to two;

means for obtaining a new reference interval by processing said n measurements of said data transfer interval in accordance with a predetermined rule; and means for updating said reference interval with said new reference interval and for storing said new reference interval in said first storing means.

8. The printer to be connected to a host system through an interface as set forth in claim 5, further comprising:

means for transporting a print form;

means for receiving print data transferred from said host system;

means for dot-developing the print data for forming second data;

means having a mechanical operation unit for printing in accordance with the second data;

means for determining an operation condition of said mechanical operation unit; and means for starting said mechanical operation unit at a substantially same time as a start of dot developing said print data when said means for determining determines that said mechanical operation unit is in a stop condition and said print data is transferred from said host system.

9. The printer according to claim 8 wherein said means for starting stabilizes an operation condition of said mechanical operation unit before dot-developing is completed.

10. The printer according to claim 8 further comprising:

first measurement means for measuring a first interval between at least a time of transfer of first data and a time of transfer of second data previously transferred from said host system to said mechanical operation unit;

means for setting a reference interval in accordance with a predetermined rule and at least one measuring of said first interval;

second measurement means for measuring an elapsed time from a time of a last transfer of data from said host system to said peripheral equipment to a present time;

means for comparing the elapsed time with the reference interval;

means for controlling a stop of said mechanical operation unit in accordance with the comparison result; and means for updating the first and reference interval.

11. A method for controlling a computer system including a host system, a peripheral equipment having a mechanical operation unit and an interface for connecting said host system to said peripheral equipment, comprising the steps of:

a first measuring step of measuring an elapsed time from a time of transfer of a last data that has been transferred most recently from said host system to said peripheral equipment to a present time;

a step of setting a reference interval;

a step of comparing said elapsed time with said reference interval and generating a comparison result;

a step of controlling a stop of said mechanical operation unit of said peripheral equipment in accordance with said comparison result;

a second measuring step of measuring a data transfer interval between a time of transfer of said last data and a time of transfer of a data that follows said last data;

storing n measurements of said data transfer interval by a first-in first-out fashion, where said n is an integer greater than or equal to two;

a step of obtaining a new reference interval by processing said n measurements of said data transfer interval in accordance with a predetermined rule; and updating said reference interval with said new reference interval and storing said new reference interval.

12. A computer system having improved idling operation comprising:

a host system;

a peripheral equipment having a mechanical operation unit;

an interface connecting said host system and said peripheral equipment;

means for storing a predetermined reference interval which is given previously;

first measuring means for measuring an elapsed time from a last data that has been transferred most recently from said host system to said peripheral equipment to a present time;

means for comparing said elapsed time with said reference interval;

means for controlling start and stop of said mechanical operation unit of said peripheral equipment in accordance with a result of said means for comparing;

second measuring means for measuring a first interval between at least a first data and a second data transferred before said present time from said host system to said peripheral equipment; and means for obtaining a new reference interval by processing said first interval with a predetermined rule and updating said reference interval with said new reference interval.

* * * * *

UNITED STATES PATENT AND TRADEMARK OFFICE
CERTIFICATE OF CORRECTION

PATENT NO.   : 5,515,528
DATED        : May 7, 1996
INVENTOR(S)  : Toshikazu Takato, et al.

It is certified that error appears in the above-indentified patent and that said Letters Patent is hereby corrected as shown below:

Claim 8, column 7, line 14, delete "claim 5" and insert therefor --claim 7--.

Signed and Sealed this

Sixteenth Day of July, 1996

Attest:

BRUCE LEHMAN

Attesting Officer          Commissioner of Patents and Trademarks